United States Patent [19]

Hong et al.

[11] 4,455,333

[45] Jun. 19, 1984

[54] DOUGHS AND COOKIES PROVIDING STORAGE-STABLE TEXTURE VARIABILITY

[75] Inventors: Charles A. Hong, Deerfield Township, Hamilton County; William J. Brabbs, Springfield Township, Hamilton County, both of Ohio

[73] Assignee: The Procter & Gamble Company, Cincinnati, Ohio

[21] Appl. No.: 240,051

[22] Filed: Mar. 3, 1981

Related U.S. Application Data

[63] Continuation-in-part of Ser. No. 107,229, Dec. 26, 1979, abandoned, and Ser. No. 220,643, Dec. 29, 1980, abandoned, which is a continuation of said Ser. No. 107,229.

[51] Int. Cl.³ ............................................ A21D 13/08
[52] U.S. Cl. ................................. 426/94; 426/502; 426/496; 426/560
[58] Field of Search .................. 426/94, 103, 549, 658, 426/502, 560

[56] References Cited

U.S. PATENT DOCUMENTS

| | | | |
|---|---|---|---|
| 1,355,129 | 10/1920 | Corby | 426/549 |
| 2,975,059 | 3/1961 | Andrews | 426/555 |
| 3,198,637 | 8/1965 | Harris et al. | 426/94 |
| 3,250,625 | 5/1966 | Thelen | 426/94 |
| 3,250,626 | 5/1966 | Thelen | 426/94 |
| 3,689,280 | 9/1972 | Werner | 99/86 |
| 3,851,084 | 11/1974 | Rossen et al. | 426/343 |
| 3,917,856 | 11/1975 | Wong et al. | 426/94 |
| 4,137,336 | 1/1979 | Radlove | 426/658 |
| 4,291,065 | 9/1981 | Zobel et al. | 426/549 |

FOREIGN PATENT DOCUMENTS

| | | | |
|---|---|---|---|
| 2414177 | 9/1915 | Fed. Rep. of Germany | 426/94 |
| 2511847 | 9/1976 | Fed. Rep. of Germany | 426/658 |

OTHER PUBLICATIONS

Matz, *Bakery Technology and Engineering*, Avi Pub. Co., Inc., Westport, Conn., 1960, pp. 407, 409, 411, 427, 448.
*The Fructose Cookbook*, Eastwood Press Books, Fast & McMillian Pub. Inc., 1979, pp. 101-111.
*Pillsbury's Bake-Off Cookie Book* "Chocolate Peanut Cookies" published in 1969.
Staehler, *Food That Really Schmecks*, pp. 193-194.
Rigglevake Kucha (Railroad Cookies) published in 1968.
Disco, *Yours For The Baking*, p. 9.
"Butterscotch Secrets", published in 1967.

*Primary Examiner*—Raymond N. Jones
*Assistant Examiner*—Elizabeth A. Hatcher
*Attorney, Agent, or Firm*—Rose Ann Dabek; Julius P. Filcik; Steven J. Goldstein

[57] ABSTRACT

Cookie products, having distributed therein (1) discrete regions providing a stable, crisp texture; and (2) discrete regions providing a stable, chewy texture, have a desirable, storage-stable plurality of textures. This can be accomplished, for example, by manipulation of sugar crystallization in different parts of the product.

48 Claims, 10 Drawing Figures

DOUGHS AND COOKIES PROVIDING STORAGE-STABLE TEXTURE VARIABILITY

This is a continuation-in-part of our prior copending U.S. patent applications, Ser. No. 107,229, filed Dec. 26, 1979, and Ser. No. 220,643, filed Dec. 29, 1980, both abandoned, the latter being a continuation-in-part of application Ser. No. 107,229.

TECHNICAL FIELD

Fresh, home-baked cookies are the standard of excellence in the cookie world. The dominant characteristic of most fresh, home-baked cookies is their texture, specifically, a crisp, friable outside surface and a ductile interior. The inside contains pockets of super-saturated sugar solution (syrup) which are ductile and are sometimes visible as strands when the cookie is pulled apart. Unfortunately, within a few weeks, or less, such cookies undergo a spontaneous and irreversible process of degradation, becoming hard and crumbly throughout. The following describes the physico-chemical processes which have now been discovered to occur during cookie baking and subsequent storage.

Prior to baking, a cookie dough consists of a hydrated mixture of flour, shortening (fat), sugar, and minor adjunct ingredients. During baking, sugar and water appear to be the prime "interactants." The flour (starch and protein) is of less importance because it does not hold water, relative to the sugar, at oven temperature.

When the cookie dough enters the oven, the water in the dough is saturated with sugar and appears to be evenly distributed throughout the dough. As the water temperature increases during baking, the solubility of the sugar increases, drawing water away from the flour. At about 70° C. all the water present has the capacity to dissolve all the sugar, as indicated by the fact that the x-ray diffraction pattern for crystalline sugar is lost. As the cookie temperature continues to increase (80° C.), a non-saturated sugar solution is formed from which the water is free to evaporate. At this point, water is rapidly lost to the atmosphere until the solution is again saturated (0.18 gram water/gram sugar). This occurs typically after about eight minutes of baking. If baking is continued, typically to the twelve minute point, the dehydration continues and a dry (0.1 gram water/gram sugar) crunchy cookie is produced, containing amorphous sugar that cannot crystallize because its water content is too low.

When a typical (eight minute) cookie is removed from the oven (100°–105° C.), most of the water is held as the hot saturated sucrose syrup. Upon cooling, this syrup becomes super-saturated, holding the water within the cookie. It is this wet syrup that gives the cookie its fresh, chewy eating quality. During the subsequent 24 hours, the sugar begins to crystallize spontaneously, and water migrates from the interior, where the water activity is relatively high, toward the moisture-depleted outer surface. During the first one to six days after baking, moisture continues to equilibrate throughout the cookie, transferring through the starch matrix. As the $a_w$ reaches about 0.6, the sugar is almost fully crystallized and the starch is tactilely dry. As time goes on, cross-sectional equilibrium is essentially reached. Unlike bread staling, these latter changes in a cookie cannot be reversed by heating, indicating that the starch in the cookie is not undergoing classic retrogradation.

Cookie texture can be quantified, as described hereinafter, in terms of stiffness, a measure of stress vs deformation, and plasticity, a measure of the tendency of the cookie crumb to plastic flow. The typical freshly baked homemade cookie has regions of high stiffness/low plasticity (crisp) and regions of low stiffness/high plasticity (chewy). As described above, and as illustrated in FIGS. 6, 7 and 8, the differences between these regions degrade with time, so that the cookies acquire a uniform texture perceived by consumers as uninteresting and somewhat undesirable.

It would be of value, therefore, to provide cookies which, having reached substantial textural equilibrium, would still demonstrate strong differences between regions having the maximum stiffness:plasticity ratios (crisp) and those regions having the minimum stiffness:plasticity ratios (chewy). This difference, best expressed as $$[\log \max(\text{stiffness/plasticity}) - \log \min(\text{stiffness/plasticity})]$$

should be substantial, i.e. a log difference of at least about 1.75, so that it is perceivable by consumers, and storage stable, so that it is suitable for production in a commercial manufacturing-marketing milieu.

Currently, nearly all feasible cookie formulations which get crisp on the outside will eventually reach that same degree of crispness throughout, reverting, by water loss and sugar crystallization, to the dry, hard texture characteristic of popular ready-to-serve (RTS) cookies. Most home recipe cookies will reach this totally crisp state within one or two weeks, regardless of the temperature or relative humidity at which they are stored, since the changes involved in cookie hardening are internal to the cookie and are thus independent of the cookie's external environment. Most RTS cookies are simply baked out to a crisp end point immediately to facilitate subsequent handling.

Cookies can be formulated to be soft and moist by high shortening and/or high water formulas. However, these cookies have only limited microbial stability, do not stay crisp on the outside, and present major problems of stickiness and crumbliness.

It is also known that sugar (sucrose) crystallization can be inhibited by the addition of fructose, which results in soft, non-hardening cookies. But fructose also gradually makes the cookie crust soft, eliminating the desired crunchy/chewy mouth texture dichotomy. Thus, fructose alone does not yield a stable cookie with the texture variability typical of freshly baked cookies.

Another approach taken within the cookie industry has been to supply a moistness impression by using coatings and/or fillings, e.g., fig bars. However, such techniques are clearly inapplicable in the case of the classic drop-type home recipe cookies, such as chocolate chip, peanut butter, oatmeal and sugar cookies and similar cookies which have a substantially homogeneous cross-section with respect to flavor and appearance.

Such prior art efforts have failed to provide more than a remote imitation of the crisp/chewy texture dichotomy which, until now, made fresh, homemade cookies unique and highly preferred. The present invention not only provides an excellent approximation of this textural dichotomy, but provides it in a shelf-stable form uniquely adapted to the marketing milieu of RTS cookies. This is done by formulating dough products having distributed therein discrete regions providing a stable, high stiffness:plasticity ratio, and discrete regions providing a stable, low stiffness:plasticity ratio, when baked. When the products of this invention have reached substantial textural equilibrium, the various regions retain their respective textures, providing the highly desirable texture dichotomy.

It has now been discovered, for example, that by combining doughs containing fructose or other crystallization-resistant sugar with doughs containing conventional sucrose- or other readily crystallizable sugar-containing cookie dough in such a manner that the two doughs remain segregated in discrete regions within the unbaked cookie, a matrix is formed which can be baked to a cookie having portions which provide a crisp texture and portions which provide a chewy texture. It has also been discovered that consumer perception of cookie freshness has only a limited relationship to the spatial orientation and organization of the two types of doughs/textures within the cookie.

By the practice of this invention, a texture profile is provided which is stable to aging, so long as packaging integrity is maintained, and very closely approximates the organoleptic properties of a freshly baked homemade cookie. Properly executed, these cookies can be made to give the appearance of a conventional homogenous system, with little or no visual evidence of a multipart structure.

BACKGROUND ART

The use of fructose, present in invert sugars and honey, in the making of cookies is widely known among those with cooking and baking experience. In addition, fructose nominally is about 1.4 times as sweet as sucrose, and has therefore been incorporated in so-called "dietetic" baking recipes. See, for example, U.S. Pat. No. 4,137,336, S. B. Radlove, issued Jan. 30, 1979.

Layered cookies are well-known. For example, Oreo TM -type filled cookies are sandwich-structured. Similarly, fig bars involve a center-filled structure in which the center portion of the cookies is of an entirely different composition than the outer shell. These cookies differ, not only in structure, but also in flavor and appearance, from the unitary cookies of the present invention.

U.S. Pat. Nos. 3,250,625 and 3,250,626, issued May 10, 1966 to Ray J. Thelen, describe cooked, leavened food laminates, of the type and texture characteristic of raised dough products such as breads, rolls, cakes, and the like. One of the materials laminated in the Thelen patents contains low levels of honey, while the others contain sucrose.

U.S. Pat. No. 3,198,637, issued Aug. 3, 1965, to M. C. Harris et al., describes the preparation of filled baked products and the filler composition used therein.

DISCLOSURE OF THE INVENTION

The present invention provides both a sweetened food product in the form of a cookie dough preform, or the like, which, when baked, provides a storage-stable plurality of textures, and the cookies made therefrom. The unbaked product comprises a matrix made from typical cookie ingredients, and is characterized in having distributed therein discrete regions providing a stable, high stiffness:plasticity ratio and discrete regions providing a stable, low stiffness:plasticity ratio, when baked. In the baked cookie, the regions with a high stiffness:plasticity ratio provide a crisp, crunchy texture, and the regions with a low stiffness:plasticity ratio provide a chewy texture. The dough products of this invention can be packaged and stored, preferably under refrigeration, for baking by the consumer. Such dough products, when baked, produce cookies which, after equilibration, retain a crisp/chewy texture profile over long periods of time, when stored in sealed containers.

Alternatively, the dough products of this invention can be baked into cookies by the manufacturer. The cookies, when packaged in relatively air- and moisture-tight containers, provide the plurality of textures they had when freshly baked, for periods of up to several months, and longer.

The cookies of this invention are of the "crumb-continuous" type which typically have a predominantly uniform distribution of the ingredients throughout the cookie, e.g. oatmeal cookies, chocolate chip or Toll House TM cookies, peanut butter cookies, sugar cookies, and other drop-type cookies. This is in distinction to the filled, coated, and sandwich-type cookies known to the art.

By "storage-stable" is meant that the cookies produced by the practice of this invention, after equilibration, retain a plurality of textures for extended periods. Depending upon their formulation, cookies prepared by the practice of this invention will, after equilibration, retain their original texture for periods ranging from weeks, at a minimum, to many months, or even indefinitely, with proper packaging and maintenance of package integrity. This is to be distinguished from those cookies which lose their texture differences over a period of up to several weeks, even when stored in air- and moisture-tight containers. It is also to be distinguished from those cookies which are baked to a single texture in production, and are either continuously hard or continuously soft from baking through storage.

By "substantial textural equilibrium" is meant the point at which those physico-chemical and structural features responsible for texture, and those physico-chemical and structural processes responsible for changes in texture have reached an approximately steady state relative to the expected usable life and storage conditions of the product. Most cookies, for example, will reach their equilibrium textures via processes which are either logarithmic or sigmoidal in their time progression. In such instances, relative inflection points and/or time constants will be fairly easy to determine. In all instances, slow, long-term processes and texture changes which extend well beyond the maximum usable life of the cookie are ignored.

By "typical cookie ingredients" is meant those ingredients common to virtually all cookies, namely, sugar, flour, water, and shortening, as well as those additional flavoring and texturing ingredients desired in the particular system being formulated. Such latter ingredients would include nutmeats, cereals, raisins, and chocolate chips, as well as egg, vanilla, cinnamon, cocoa, and the numerous other similar materials commonly found in cookies, as desired.

By "flour" is meant the finely comminuted meal of any cereal grain or edible seed. Typical non-limiting examples are wheat flour, barley flour, rye flour, corn starch and corn flour, but also encompassed by this term as used herein are the so-called synthetic flours, which incorporate such materials as starch and soy protein isolate, with or without heat and/or steam treatment.

By "shortening" is meant edible fats and oils suitable for cooking or baking, as well as combinations of edible fats and/or oils with appropriate food grade emulsifiers, such as polyglycerol esters, sucrose monoesters, mono and diglycerides, lecithins, egg yolk and other phospholipids, and the like. Also included are oleaginous products such as butters and margarines.

The term "water activity" ($a_w$) is used herein in its usual context to mean the ratio of the fugacity of water in the system being studied (f) to the fugacity of pure water ($f_o$) at the same temperature. The water activity of the products and compositions herein can be measured using well known physical chemical techniques and commercially available instruments.

By "readily crystallizable sugar" is meant a mono- or disaccharide, or mixture of mono- and/or disaccharides, that readily and spontaneously crystallizes at the water content and water activity conditions encountered in semi-moist cookies of the home-baked type. Sucrose is virtually unique among the readily available food sugars in this regard, crystallizing spontaneously at $a_w$ levels from about 0.25 to 0.8 in normal cookie systems. Mixtures of readily crystallizable sugars with other mono- and/or disaccharides, where readily crystallizable sugars comprise over 85% of the total sugar, exhibit crystallization behavior similar to a pure readily crystallizable sugar.

By "crystallization-resistant sugar" is meant a mono- or disaccharide, or mixture of mono- and/or disaccharides, which crystallizes, at the water content and water activity encountered in the semimoist cookies of the home-baked type, substantially more slowly than sucrose under the same conditions, typically remaining uncrystallized for periods of at least 1-6 months. Particularly good crystallization resistant sugars are fructose, dextrose, and mixtures of sugars of which fructose and dextrose together comprise at least about 15% by weight, and solutions thereof. Others include psicose, fructose, sorbose, tagatose, allose, altrose, mannose, gulose, idose, galactose, talose, maltose, and lactose.

"Monosaccharides" and "disaccharides" as used herein are compounds well known to the art. Monosaccharides have the empirical formula $(CH_2O)_n$, where $n \geq 3$. The carbon skeleton of the common monosaccharides is unbranched and each carbon except one bears an —OH group; the remaining carbon is generally combined in an acetal or ketal linkage. Hexoses, both aldose and ketose forms, straight chain and pyranose or furanose forms, are preferred herein. The ketohexoses include psicose, fructose, sorbose, and tagatose. The aldohexoses include allose, altrose, glucose, mannose, gulose, idose, galactose, and talose.

Disaccharides consist of two monosaccharides joined by a glycosidic linkage. The most common disaccharides are maltose, lactose, and sucrose.

By "fructose" is meant the ketohexose having the straight chain formula

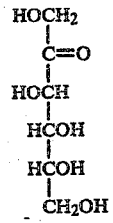

Fructose is a commonly available, crystallization-resistant food-acceptable monosaccharide remaining free of significant crystallization indefinitely under the conditions described herein. Dextrose (glucose) and maltose also exhibit crystallization resistance. Further, mixtures of readily crystallizable sugars with other sugars, where the readily crystallizable sugars comprise less than 85% of the total sugar mixture exhibit crystallization resistance similar to what would be expected if the entire sugar system were of a crystallization-resistant species. Of course, the relationship between sugar composition and crystallization is a continuum. At 85:15 readily crystallizable sugar:other sugars, crystallization will be inhibited for about 3 weeks, and slowed thereafter. Thus, such mixtures also meet the definition of a crystallization-resistant sugar. At about 3 weeks, however, such a mixture becomes "readily crystallizable". Preferable is 80:20 readily crystallizable:other sugars, and most preferable is at most 75% readily crystallizable sugars, which latter mixtures remain uncrystallized essentially indefinitely, compared to the lifetime of the cookie.

In other words, the sucrose is inhibited from crystallizing by the presence of the crystallization-resistant sugar. The delay in crystallization of the sucrose is related to the amount of fructose in the mixture. Thus, the relationship between sugar composition and time to crystallization is a continuum. At 85:15 sucrose:fructose, crystallization of the sucrose will be inhibited for about three weeks. Thus, for that limited period of time, the entire sugar mixture may be said to also meet the definition of a crystallization-resistant sugar. At about 3 weeks, however, the sucrose in the mixture will begin to crystallize.

By "high-fructose corn syrup" is meant commercially available corn syrups which have been enzymatically modified to increase its fructose content. These materials usually have solids contents of from about 60% to about 85%; of this, from about 40 to about 100% is fructose, and virtually all of the balance is dextrose.

By "double chocolate cookies" is meant a cookie which contains both cocoa as a dough ingredient, and "chocolate chips", Toll House TM morsels, or the like.

The term "matrix" is used herein to indicate that the ingredients in a typical cookie formulation are not all mutually soluble, so that, while the cookie dough and/or crumb portion may appear macroscopically homogeneous, at the microscopic level specific starch granules, pockets of syrup, crystals of sugar, oil droplets, inclusions, etc., can be identified.

By "baking" herein is meant radiant, conductive, or convective exposure to energy of a type which imparts thermal energy to the product being baked. It thus includes conventional, convection and microwave oven baking.

All percentages herein are by weight, unless otherwise indicated.

QUANTIFICATION OF TEXTURE

Figure 6:
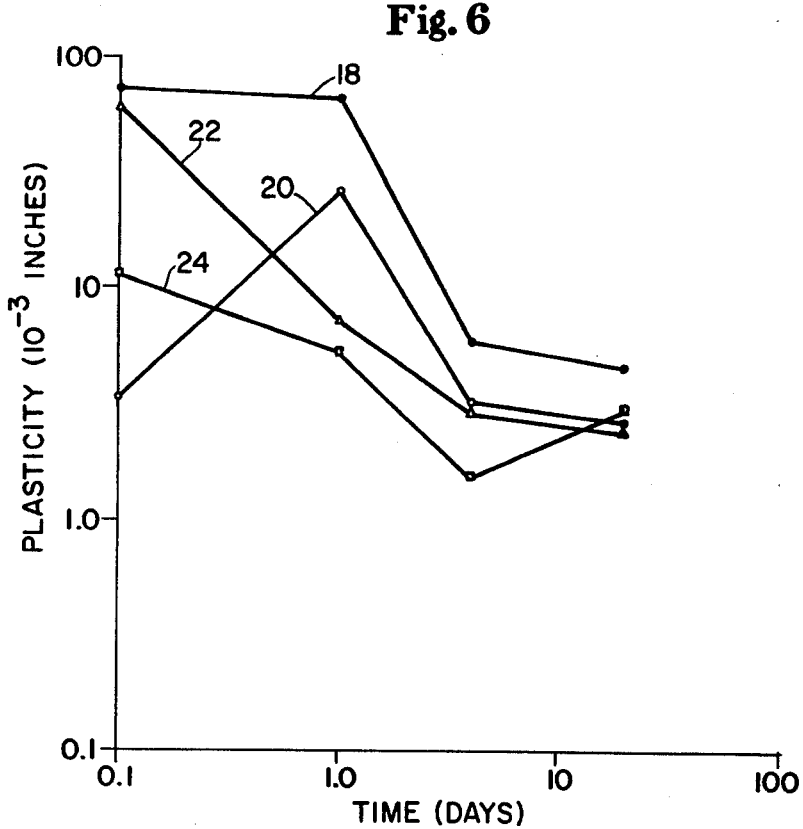
FIG. 6 is a graph of plasticity vs. time for a Duncan Hines ® Chocolate Chip Cookie Mix cookie.
Figure 7:
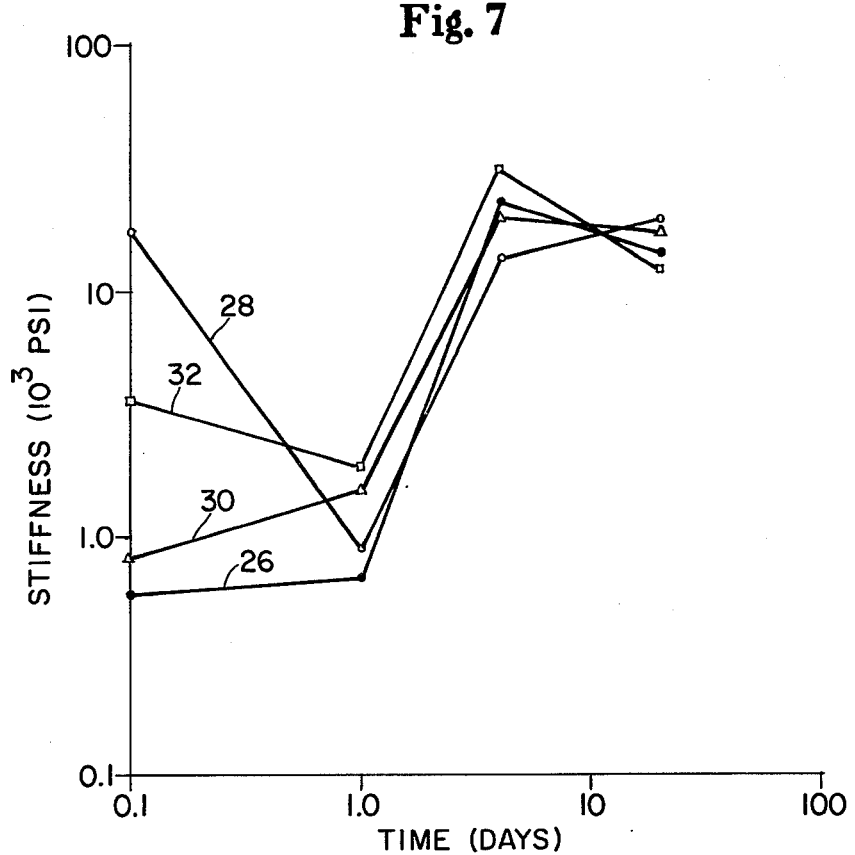
FIG. 7 is a graph of stiffness vs. time for the same cookie.
Figure 8:
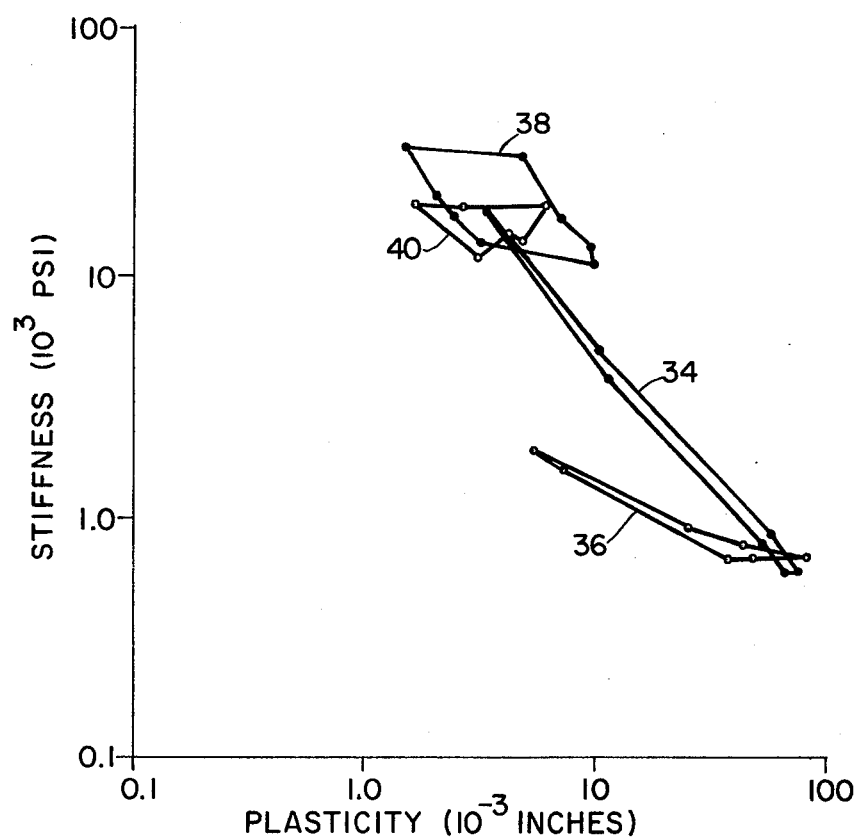
FIG. 8 is a graph of stiffness vs. plasticity for the same cookie.

When stiffness and plasticity for a number of identical samples have been determined, they can be plotted individually vs. location of the test point in the cookie to determine the cookie's overall texture profile. It is then useful to prepare a plot displaying stiffness as the ordinate and plasticity as the abscissa, so that both measurements for each penetration site within the cookie can be displayed simultaneously. When plotted on a logarithmic graph, the collection of data points from various locations within the cookie will, in most cases, be found to form a small cluster. Two exceptions will be observed. Freshly baked homemade cookies will exhibit an elongated spread of data points reflecting their characteristic textural variation from crisp to chewy. Similarly, cookies of the present invention will also exhibit the same plurality of textures within a single cookie. However, as the data in FIGS. 6, 7 and 8 illustrate, typical freshly baked cookies will eventually equilibrate to a single texture, forming, as do commercial cookies in the art, a small cluster of data points. Accordingly, in comparing cookies of the present invention to other cookies, it is necessary to measure the cookies at a point in time at which the cookies, whether of this invention or not, have reached substantial textural equilibrium. For most cookies, this will occur within a matter of two or three days, although some recipes may require up to a month to reach equilibrium. The cookies of the present invention are essentially stable within 3 weeks after baking, and retain their textural diversity thereafter.

Figure 1:
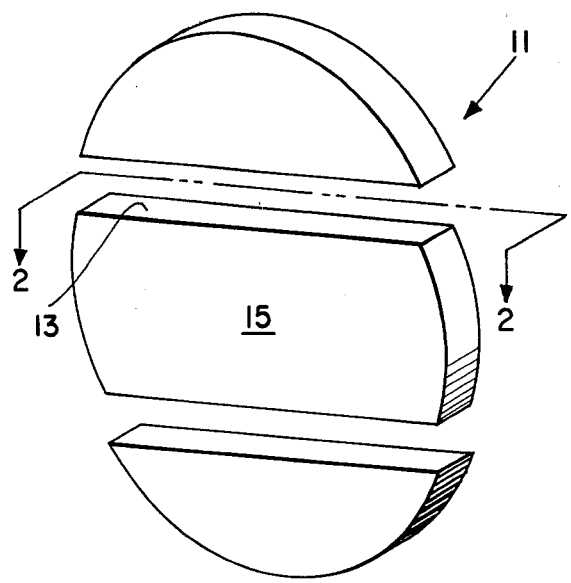
FIG. 1 is an exploded schematic perspective view illustrating removal of a cookie section for probe texture profile testing.

FIG. 1 shows a sample cookie 11 sectioned transversely to provide a sample section 15 having sample surface/area 13. The section is selected so as to contain the regions exhibiting the greatest texture differences, i.e., the crispest regions and chewiest regions.

Figure 2:
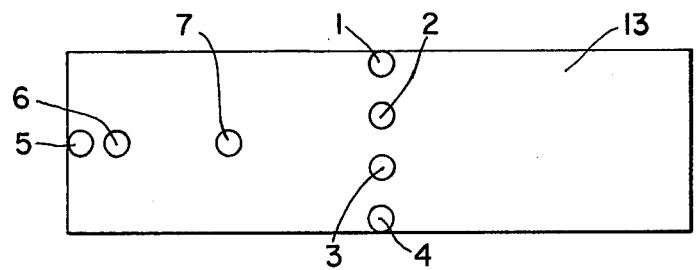
FIG. 2 is a schematic representation of the pattern of test points used in evaluating a typical drop cookie section.
Figure 3:
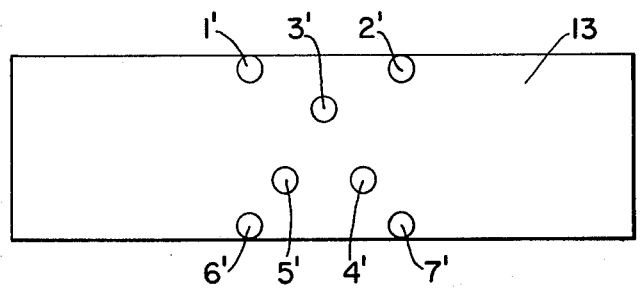
FIG. 3 illustrates a variant pattern of test points, such as might be used when evaluating a cookie in which the regions of crisp and chewy texture have not been spatially organized to mimic the texture of the typical homemade drop cookie.

FIG. 2 shows test points 1–7 arranged across sample surface/area 13 to measure both top-to-bottom and center-to-edge texture profiles. FIG. 3 shows an alternative arrangement of test points 1'–7' on 13 to maximize texture information obtained where the texture profile of the cookie is not arranged top-to-bottom or center-to-edge.

Figure 4:
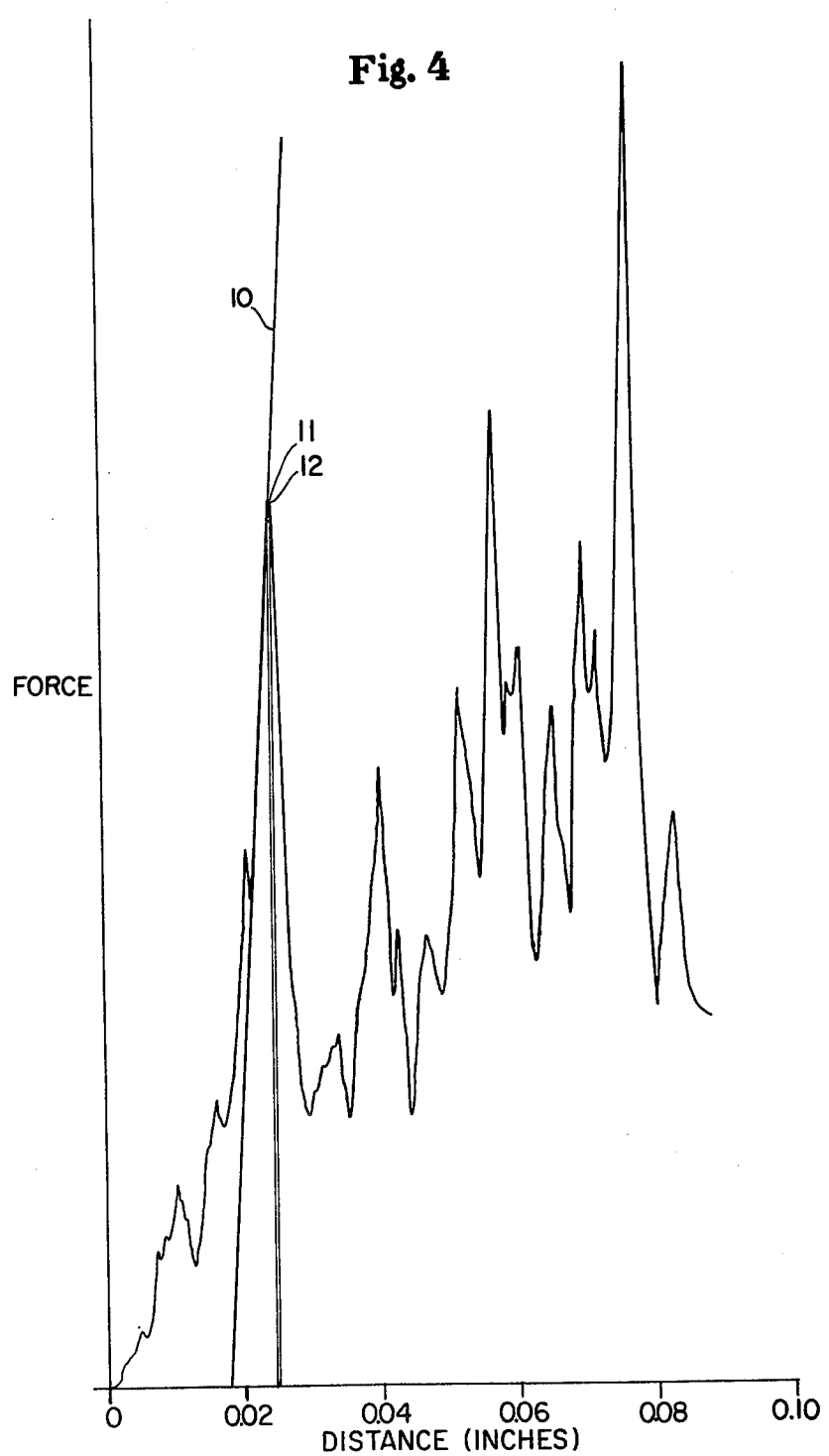
FIG. 4 illustrates a representative Instron force vs. penetration plot for a crisp cookie region.
Figure 5:
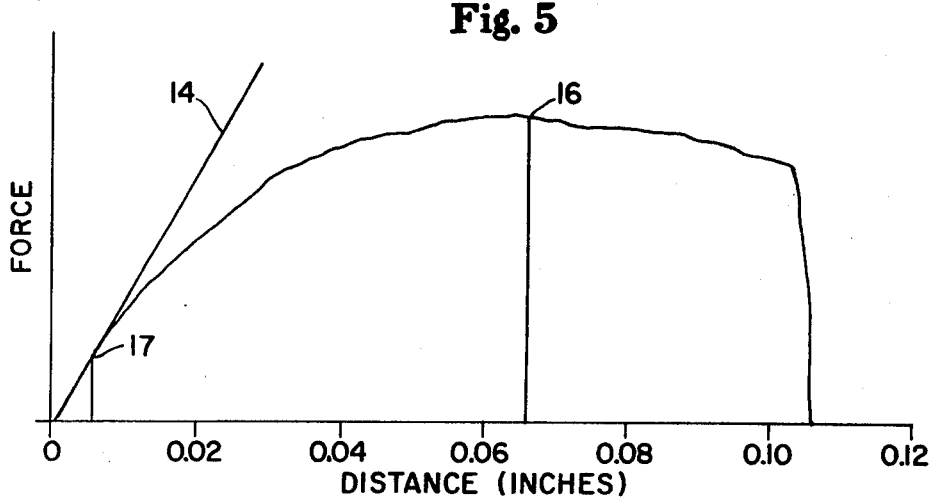
FIG. 5 illustrates a representative Instron force vs. penetration plot for a chewy cookie region.

FIG. 4 illustrates a typical raw penetration recording from a crisp cookie region. Raw data from this graph is then converted to standard units and/or normalized by application of appropriate conversion factors. Stiffness of the crumb is derived from the slope of line 10, while plasticity is calculated from yield point 11 and fracture point 12 (virtually identical in this graph, indicating near zero plasticity, not uncommon with crisp crumbs.) Similarly, stiffness and plasticity can be determined from the graph of penetration from a chewy crumb, as illustrated in FIG. 5, with fracture point 16 and yield point 17.

FIGS. 6 and 7 illustrate the texture deterioration which occurs in even the best homemade cookies. In FIG. 6, the plots of plasticity of the center 18, bottom 22 and top 24 show that plasticity for all these regions of the cookie not only decreases, but the substantial differences in plasticity between regions are markedly reduced. The plot for the edge, 20, shows the texture swings and reversals which often accompany aging. Similarly in FIG. 7 the edge stiffness 28, originally the highest, becomes so reversed that for a time it is actually less stiff than the center 26 of the cookie. All plots, including bottom 30 and top 32 show a trend to increasing stiffness with time, along with markedly reduced textural diversity.

These differences are more easily appreciated from FIG. 8 in which the texture profiles of the cookie are plotted. It can be seen that the plot 34 for the cookie at 0.1 day indicates the excellent textural diversity typical of fresh, homemade cookies. In the plot 36 at 1 day aging, water transfer within the cookie can be seen to have (1) reduced the textural diversity; and (2) softened the crisper regions of the cookie. By 4 days, plot 38, sugar crystallization has become the dominant texture-related process, making the cookie significantly crisper throughout and reducing still further the texture differences in the cookie. At 20 days, plot 40, further crystallization has rendered the texture essentially uniform: it is hard throughout.

Figure 9:
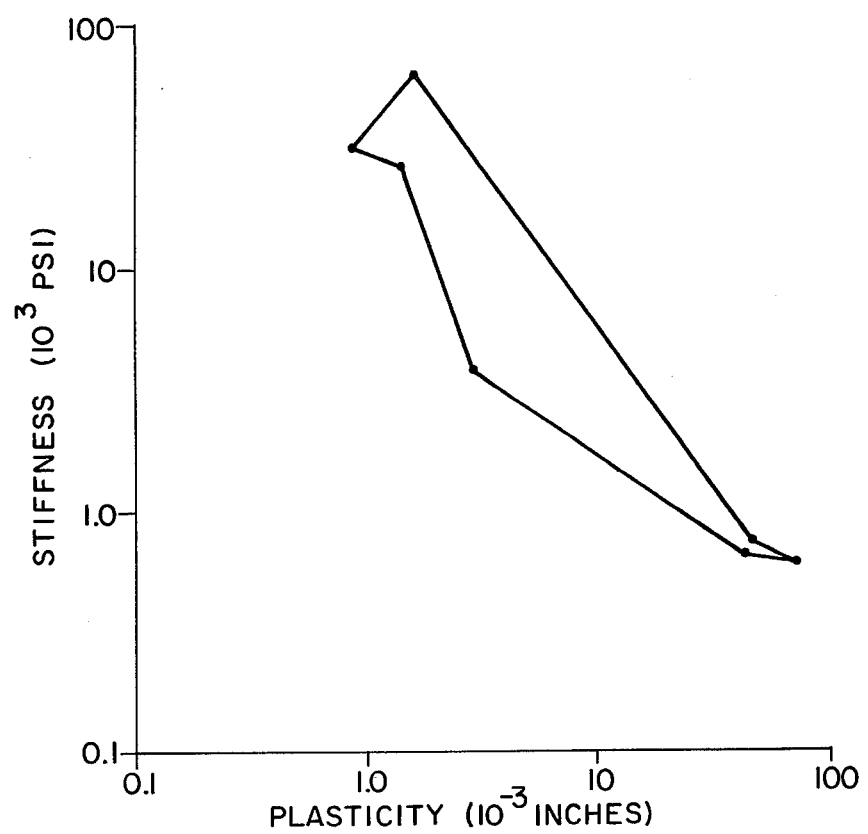
FIG. 9 is a graph of stiffness vs. plasticity for an aged cookie of this invention.
Figure 10:
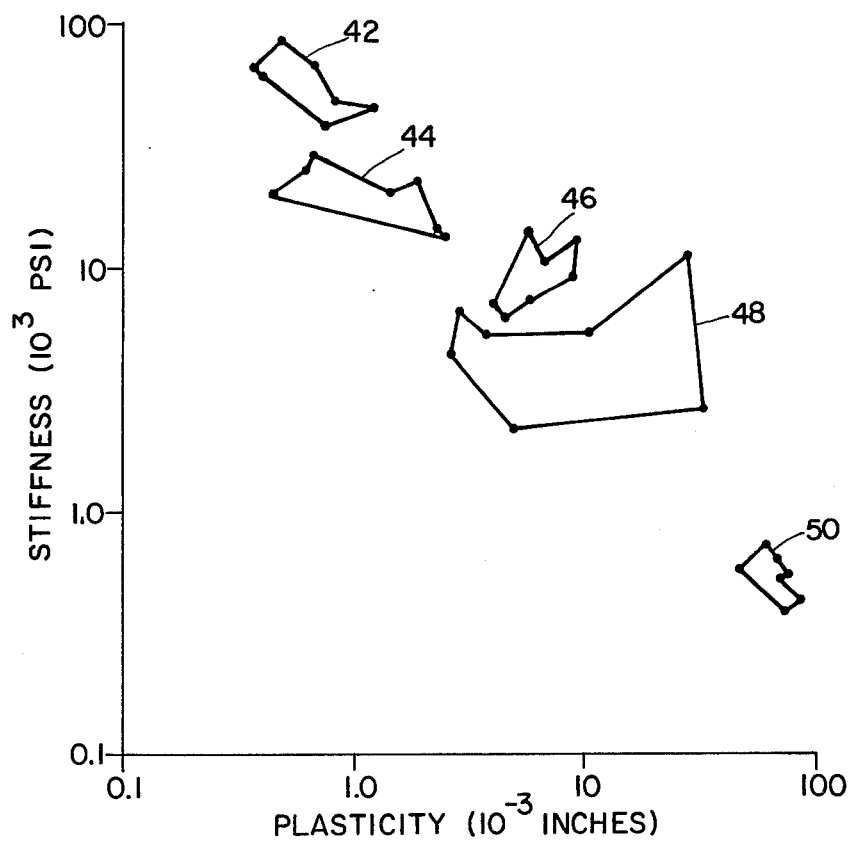
FIG. 10 is a graph of stiffness vs. plasticity for several RTS cookies from the art.

In striking contrast is the plot in FIG. 9 of a cookie of this invention after 25 days (3.6 weeks) of aging under identical conditions. The broad textural diversity can easily be seen, despite prolonged aging.

This can be contrasted still further with texture plots of store-purchased samples of current commercial RTS cookies: Pepperidge Farm ™ 42, Chips Ahoy! ™ 44, Bakers Dozen ™ 46, and Archway Chocolate Chip Supreme ™ 48, as well as a RTS coconut macaroon 50. Little textural diversity can be seen in any of the latter samples.

It can be seen from the figures that a useful measurement in determining the texture of the cookies herein is the ratio of stiffness to plasticity, cookie portions having a large stiffness:plasticity ratio being crisper and crunchier, and cookie portions with a small stiffness:plasticity ratio being softer and chewier.

In general, a stiffness:plasticity ratio of at least about $2 \times 10^6$ can be considered "crisp", while a stiffness:plasticity ratio of less than about $0.5 \times 10^6$ can be considered "chewy". However, since crumbs having stiffness:plasticity ratios less than about $2 \times 10^6$ and greater than about $0.5 \times 10^6$ exist, it is preferable to define the cookies herein in terms of the texture difference, expressed as the difference between the logarithm of the maximum stiffness:plasticity ratio and the logarithm of the minimum stiffness:plasticity ratio (absolute value). In the cookies of the present invention, such a "log difference" should be at least about 1.75. Thus, a cookie having a maximum stiffness:plasticity ratio of about $90 \times 10^6$ and minimum stiffness:plasticity ratio of about $1.5 \times 10^6$ at textural equilibrium would fall within the scope of the present invention, having a log difference of about 1.78. Such cookies, heretofore unavailable to the art, not only provide the texture variability consumers have previously come to expect only from freshly baked homemade cookies, but also retain their texture in prolonged storage.

DESCRIPTION OF A PREFERRED EMBODIMENT

The present invention is preferably embodied by a sweetened food product in the form of a cookie dough preform, or the like, comprising a matrix made from typical cookie ingredients and being characterized and having distributed therein discrete regions containing readily crystallizable sugar and discrete regions containing crystallization resistant sugar, whereby the product, when baked, provides a storage-stable plurality of textures, the regions containing crystallized sugar providing a crisp texture, and the regions containing crystallization-resistant sugar providing a chewy texture.

In its preferred execution, the present invention provides a dough-based, ready-to-bake sweetened food product which, when baked, has a substantially homogeneous cross-section with respect to flavor and appearance and a shelf-stable cross-sectional texture variability typical of freshly baked cookies, made by the process of preparing a first cookie dough from typical cookie ingredients containing a crystallization-resistant sugar or solution thereof as disclosed herein, preparing a second cookie dough, containing a readily crystallizable sugar or solution thereof also as disclosed herein, and substantially enveloping said first dough with a layer of said second dough, thereby forming a ready-to-bake, laminated dough structure.

Laminated dough structures can be made according to the foregoing process, wherein one or both doughs further comprise a member selected from the group consisting of cereals, nutmeats, peanut butter, cocoa, raisins, chocolate chips, and butterscotch chips, and mixtures thereof. Nutmeats include the whole or chopped meat of any edible nut, including walnuts, black walnuts, hickory nuts, hazel nuts, brazil nuts, peanuts, macadamia nuts, pecans, almonds, cashews, and the like. Another nutmeat especially suitable for use in cookies is coconut.

The sugar component of the first cookie dough ("chewy") used in making laminated dough structures consists essentially of crystallization-resistant sugar or a solution thereof. The most preferred crystallization-resistant sugars are dextrose and fructose. Also highly preferred are mixtures of mono- and di-saccharides containing at least about 20% fructose by weight. Preferred forms of such mixtures include high-fructose corn syrup, invert sugar, and honey.

The sugar component of the second cookie dough ("crisp") used in making a laminated dough structure consists essentially of a readily crystallizable sugar or solution thereof. Readily crystallizable sugars include sucrose and mixtures of sucrose and other mono- and disaccharides which comprise at least 75%, preferably at least 80%, most preferably at least 85% sucrose by weight.

Baked food products, i.e., cookies, are made by a process described hereinabove, which process further comprises the step of baking the laminated dough structure, preferably to a final $a_w$ of from about 0.25 to about 0.8, most preferably from about 0.3 to about 0.55. While not intended to be limited by past practice, cookie baking times typically range from about five minutes to about fifteen minutes, depending on the number of cookies being baked, the size and shape of the cookie, the cookie ingredients, oven temperature, and like factors. The baking process is straightforward, no modifications being needed for the practice of this embodiment. Baking can either be performed in the batch mode, as is typically done in the home, or in continuous fashion, as is often done in commercial bakeries.

A variety of cookies can be produced by the foregoing process, depending, of course, upon the adjunct ingredients used in preparing the doughs, including sugar cookies, oatmeal cookies, peanut butter cookies, chocolate chip cookies, and double chocolate chip cookies.

While the foregoing illustrates one preferred mode of practicing this embodiment of the present invention, other, potentially less preferably executions of this embodiment of the invention can also be practiced.

In some cookie formulations, depending upon the baking processes employed, it may not be necessary to cover the entire surface of the crystallization-resistant sugar-containing dough with the readily crystallizable sugar-containing dough. For example, the bottom surfaces of cookies baked on metal cookie sheets are heated directly by conduction through a medium which has high heat conductivity, while the remainder of such cookies are heated via the less efficient processes of radiation and convection. Thus, the bottom surface of dough which is baked on a metal baking sheet will be crisper, when the cookie is removed from the oven, than the remainder of the cookie, even if the dough contains crystallization-resistant sugar. Accordingly, the present invention also provides a ready-to-bake sweetened food product, which, when baked, has a substantially homogeneous cross-section with respect to flavor and appearance and a shelf-stable cross-sectional texture variability typical of freshly baked cookies, comprising a discrete body of a first cookie dough which comprises a crystallization-resistant sugar component and flour and shortening, and a lamina of a second cookie dough superposed on at least a portion of the surface of said first cookie dough, said second cookie dough comprising a readily crystallizable sugar component and flour and shortening, thereby forming a laminated dough structure.

It can also be appreciated that the present invention offers the opportunity to make entirely crumb-continuous cookies which provide the crisp exterior/chewy interior typical of home-style cookies, but in which various regions differ substantially in flavor and/or appearance. For example, a chocolate flavored crisp dough can be laminated onto a peanut butter flavored chewy dough to produce a "peanut butter cup" cookie. Such cookies are also encompassed by the present invention.

Laminated dough structures may be formed by a variety of techniques, such as by applying a layer of crisp cookie dough to only the top part of a mass of chewy cookie dough; by embedding particles or granules of crisp cookie dough in a body of chewy cookie dough, or vice versa; by winding or otherwise distributing strands of extruded crisp cookie dough upon the surface of a ball of chewy cookie dough; by laminating alternating sheets of crisp and chewy doughs and rolling and slicing to form a "pinwheel" structure; and a variety of other techniques well within the grasp of those in the food production art.

Of course, it will be recognized that the cookies of this invention can be used as the biscuit or crumb portion of a sandwich or filled cookie. The biscuit areas will maintain their textural diversity when incorporated into these structures.

It can be seen that the present invention also provides a method for making laminated dough structures, comprising preparing a first cookie dough from typical cookie ingredients comprising a crystallization-resistant sugar component and flour and shortening; preparing a second cookie dough comprising a readily crystallizable sugar component and flour and shortening and applying a layer of said second dough to said first dough, thereby forming a laminated dough structure.

It can also be appreciated that each of the processes disclosed herein for making the products of this invention, while described in some cases as being performed by hand, can be adapted to high speed automation. Examples of applicable techniques include those used for making ravioli, fig bars, and filled candies.

FORMULATION

Sugar, flour, water and shortening, when combined in almost any reasonable proportions, will produce a dough that can be baked to form a cookie—the classic "sugar cookie". Of course, the sweetness, texture and similar organoleptic properties of the cookie will depend upon the ratio of sugar/flour/water/shortening. In general, any cookie recipe which produces an organoleptically acceptable crumb-continuous cookie (as opposed to filled, iced and sandwich-type cookies) can be employed in the practice of the present invention. Some such recipes will incorporate additional ingredients. For example, oatmeal cookies generally contain rolled oats to provide their characteristic flavor and texture. Peanut butter cookies will, of course, contain peanut butter, which provides not only the distinctive flavor of peanut butter, but also oils (shortening) and peanut solids which supply both carbohydrates and proteins, similar to flour. Within limits, well known to the art, materials which "interrupt" the homogeneous composition of the typical cookie can be introduced into the formulation. These materials are essentially inert, so far as the chemistry of the cookie dough is concerned. Examples of such materials, referred to hereinafter as "inclusions", are chopped nuts, chocolate chips or Toll House TM morsels, coconut, butterscotch chips, oatmeal, peanut butter chips, raisins, and the like. Even in simple cookies, such as sugar cookies, it may be desirable to incorporate additional flavoring materials, such as spices.

The ratio (w/w) of chewy dough to crisp dough (exclusive of inclusions) is important in producing an appropriate textural cross section in the finished cookie. For example, the typical home baked cookie currently made can be considered a 0:1 ratio chewy dough:crisp dough cookie, and after aging is undesirably hard and crumbly throughout. On the other hand, a cookie made entirely from dough containing crystallization-resistant sugar such as fructose could be characterized as a 1:0 chewy dough:crisp dough cookie, which lacks the desirable surface crispness of the typical home baked cookie. The laminated dough structures of the present invention are generally made to contain from about 0.2:1 chewy dough:crisp dough to about 5:1 chewy dough:crisp dough, preferably from about 0.7:1 to about 2:1. At ratios of less than 0.2:1, the water-starved crisp dough tends to rob moisture from the chewy dough, degrading its normally chewy eating texture. Conversely, at ratios greater than about 5:1, the regions of crisp dough must be made very small in comparison to the relatively large volume of chewy dough, and thus become difficult to work with. In addition, since the doughs have limited structural integrity, it is very likely that the chewy dough will break through the thin crisp dough as the laminated dough structure softens during baking, and discrete regions of dough will not be maintained. Most preferred from the standpoint of product texture and ease of manufacture, is a chewy dough:crisp dough ratio of about 1.3:1.

Both the chewy dough and crisp dough employed in producing the laminated dough structures of the present invention are amenable to the sort of formula modifications commonly employed in the baking art. In particular, in the practice of the present invention, it is desirable to incorporate such materials as dough conditioners into the crisp dough to reduce crumbliness and improve browning characteristics. Two additives, fructose and the calcium salt of stearoyl 2-lactylate, appear to improve crumbliness in aged cookies of this invention. These are incorporated in the crisp dough in minor proportions, generally less than about 5% fructose (total sugar weight basis) and/or less than about 5% calcium stearoyl 2-lactylate (fat weight basis, which equals about 1.2% by weight of the total dough system). The fructose level in the crisp dough must be kept sufficiently low that the sucrose in the crisp dough remains readily crystallizable. Most preferred is amount 2% fructose (sugar basis).

Handling and baking characteristics of the crisp dough can also be improved substantially by use of somewhat higher flour levels.

In addition, the laminated dough structure system offers the opportunity for further formula modifications which enhance the cross-sectional texture variability of the cookie. For example, an inner, chewy dough can be formulated to be much shorter than an outer, crisp dough, or with shortening having a lower melting point than that of the crisp dough. Such chewy doughs would normally bake into unacceptable cookies because of their relatively thin consistency and consequent lack of structural integrity during baking. When baked, they would spread or run undesirably, becoming unacceptably browned and crisp as a result. However, such doughs, when used as the chewy dough of a laminated dough structure, can easily be baked, because the outer, crisp dough acts as a container or shell for the chewy dough during the early part of the baking process. Toward the end of the baking process, the shell of outer dough collapses around the inner, chewy dough to form a familiar cookie of apparent unitary structure and composition, but in which the center is exceptionally rich and chewy.

Cookies of this invention made by manipulation of sugar crystallization will in some cases require "tempering" prior to reaching textural equilibrium, when the crystallizable sugar is in transition from the amorphous (glass) form to the crystalline form. During this period, the crisp dough regions will soften slightly and then become crisp again.

INDUSTRIAL APPLICABILITY

While the foregoing illustrates a preferred mode of practicing the present invention, other executions of the basic concepts of the present invention can also be practiced.

It will be appreciated that in its broadest aspect, the present invention provides a baked, sweetened food product in the form of a cookie, or the like, comprising a substantially dough-continuous matrix of typical cookie ingredients and being characterized in having, at a time after reaching substantial textural equilibrium, a

[log max(stiffness/plasticity) − log min(stiffness/plasticity)], as defined hereinafter, of at least about 1.75, preferably at least about 2. Such cookies can be prepared by a variety of techniques as disclosed herein, as well as by other techniques which will become evident to those familiar with the art of cookie manufacture.

One method of preparing the cookies of this invention is the single dough invertase process of Youngquist, as described in his copending U.S. Pat. application Ser. No. 220,603, filed Dec. 29, 1980, now U.S. Pat. No. 4,344,969 issued Aug. 17, 1982 which is hereby incorporated herein by reference. In general, the Youngquist process involves incorporation of invertase or a similar glycosidase into a single cookie dough of typical formulation, and baking by a multi-step process involving (1) retarding enzyme activity prior to baking; (2) deactivating the enzyme in a portion of the cookie, preferably the surface, such as by a short, high-temperature bake; (3) allowing the remaining active enzyme to operate on the sugars in the cookie; (4) final baking; and (5) deactivation of the remaining enzyme, which can be simultaneous with final baking.

Yet another method involves the injection of fructose or other sugar crystallization inhibitor into already baked cookies prior to staling or crystallization in patterns and quantities which allow the cookies to retain discrete regions containing readily crystallizable sugar and discrete regions containing crystallization-resistant sugar. The resulting cookies will have the storage stable plurality of textures provided by this invention.

Within the limits of operability, it will be appreciated that other formula manipulations, i.e., shortening composition and level, emulsifiers, starch characteristics, etc., which produce shelf stable crisp and chewy regions in the finished baked product, can also be used in the practice of this invention.

In general, formulation and fabrication techniques will be highly variable, at the discretion of the manufacturer, depending upon the type of cookies produced, manufacturing and baking equipment used, price and availability of ingredients, etc. However, cookies of this invention will be characterized in having a storage stable plurality of textures, describable as "crisp" and "chewy". These textures can be quantified, and the cookies of this invention identified, by the instrumental techniques described hereinafter.

Probe Texture Profile Testing

A number of representative samples of the cookie type to be tested are chosen (FIG. 1), and from each of the samples a 1.27 cm (0.5 in.) slice 15 is taken from the cookie 11, using a hacksaw blade having approximately 7 teeth/cm. (188 teeth/in). For some cookies, cutting with a sharp, smooth-edged knife may be preferable to maintain crumb integrity. The cookies should be cut, as much as possible, so as to minimize the presence of inclusions in the sampling area 13, the objective being to insure that the texture of the crumb portionn of the cookie is measured. Raisins, nuts, and chocolate chips are examples of such inclusions. The slice 15 should also be taken so that the sampling area 13 exhibits the greatest texture variability.

The general case, a top-to-bottom and center-to-edge profile, is typical of fresh baked cookies and is described in detail below. Other situations, such as the pinwheel, would use a similar procedure once the profile is established by initial tests.

General Case

A series of seven penetrations (1-7 in FIG. 2) using a cylindrical probe are made perpendicularly across the cross section of each sample. In general, the seven penetrations are made in straight line patterns across the sample from top to bottom and edge to center. The lines are taken within a region of ±0.65 cm either side of the approximate center of the sample (FIG. 2). The first of the four top-to-bottom penetrations, 1, enters the top crust and the last, 4, enters the bottom crust. The two remaining penetrations 2 and 3 in the top-to-bottom axis are equally spaced across the sample. Of the three edge to center penetrations, the first 5 is taken at the outer edge crust, the second 6 is taken within 0.5 cm of the outer edge crust, and the third 7 is taken midway between the edge crust and the top-bottom axis. However, if visual examination of the sample warrants, the number of penetrations and their pattern over the cross section may be altered in any way that would better expose the presence of any textural variations.

The penetrations are spaced with a minimum distance of three probe diameters between each point (FIGS. 2 and 3). This minimizes the possible effect of structural breakdown from one penetration to another. If necessary due to the structure of the sample, this distance may be increased. Where the height of the cookie is not great enough to permit four penetrations in a straight line, fewer penetrations, or penetrations (1'-7') arranged in an alternative pattern (FIG. 3) may be appropriate. Conversely, if the height of the cookie warrants, more than four penetrations may be employed if necessary to characterize the sample more accurately. In addition, the position of each penetration is selected so as to avoid penetration into inclusions, voids, or anything else which might not be indicative of the textural character of the crumb of the cookie.

The penetrations are made at an angle perpendicular to the sample.

The test equipment is set up as follows. An Instron Universal Testing machine is fitted with a 0.89 mm (0.035") cylindrical probe having a ~30° tapered tip. For this purpose, a #65 drill bit (such as National No. 65H.S., list 208 EDP 13365), shank (non-fluted) end, is satisfactory. The probe is mounted on the Instron crosshead perpendicular to a load cell, which rests on the base of the Instron.

The cookie section 15 is placed on the load cell, beneath the probe, and is supported on both sides by 200 g weights, which serve to immobilize the cookie section 15 during penetration. The weight of the supports and the cookie section are then tared by the Instron control system.

A 2 kg load cell is used to obtain maximum resolution of the small forces being measured. The Instron can be set to read 100, 200, 400, 500, 1000 or 2000 grams full scale. For each penetration, the setting providing maximum resolution without overload is conveniently used.

The output of the Instron is graphically recorded on a strip chart recorder displaying force and penetration distance as the ordinate and abscissa, respectively.

The probe penetrates the immobilized cookie section downwardly at a speed of 0.085 mm/sec. (0.2 in/min.). Penetration is carried to a depth of at least 0.254 cm (0.1 in), and up to 0.508 cm (0.2 in) if no major fracture is observed by 0.254 cm. The strip chart recorder, plotter, or the like is conveniently run at 0.42 cm/sec. (10 in/min) to resolve individual events during penetration.

In conduct of the tests, the cookie sample is positioned on the load cell so as to align the probe with the desired sample site. The Instron crosshead is lowered manually until the probe tip just touches the sample surface, as indicated by a small output signal (at 100 g full scale), and the penetration is conducted. After the penetration tests for the cookie section are completed, the crosshead is raised and the sample is removed so that the probe and load cell can be cleaned.

In analyzing the output curves from the penetration tests, it should be understood that, occasionally, aberrant results will be obtained. Cookies will occasionally disintegrate, inclusions will be contacted by the probe, voids will be encountered, etc. It must be emphasized that the data are best understood when taken cumulatively, as averages over several test runs, and obviously aberrant runs should be discarded. In addition, unless equipment is available to automate processing of the curves, judgment will be required in ascertaining slopes of curves, inflection points (yield and fracture) and the like.

Typical Instron curves are shown in FIGS. 4 and 5. Two measurements are taken from each curve. Stiffness is measured in the linear range of the curve. It is derived from the maximum typical slope of a curve for a given penetration. A line of slope 10 must involve a rise $\geq 5\%$ of the maximum force observed during the penetration. For a chewy (nonlinear) curve, the maximum line of slope 14 tangent to the curve is chosen. In all cases, small deflections observed as the probe seats itself in the crumb are ignored.

Regions in the curve occuring late in the penetration and having atypically high slope values plus a twofold increase in typical peak force are most likely inclusions and are neglected.

Curves which appear directionally linear but contain many small variations or waves are resolved by using a straight line approximation of the slope. Stiffness (analogous to elastic modulus) is calculated herein from the measured slope by multiplying by a factor of 572 (based on probe tip area, chart units, etc.) to convert to psi.

The second measurement which is obtained from the penetration graphs is the plasticity, which is defined as the amount of deformation (penetration) which occurs between the yield point (12 in FIG. 4) and the fracture point (16 in FIG. 5). The yield point is defined as the point where the curve deviates from the straight line used to define its slope, and the fracture point is the point after the peak force of the fracture at which the slope is less than $-0.25$ or, if $-0.25$ or less slope is not observed, the point at which the force required has decreased to 90% of the peak force required for the fracture. If neither of the above conditions obtains, the point at which the slope next becomes positive, or the point on the curve at the end of the test is used. 0.254 cm. (0.1 in.) is the maximum plasticity value used.

In determining the yield point, the original line of slope is used only if the fracture force is $>50\%$ of the peak force required in the penetration. If small offset discontinuities occur in the elastic portion of the curve measured, the line of slope is established tangent to the curve at a point immediately past the discontinuity. If the slope of the curve immediately past the discontinuity changes, a new line of slope is drawn, solely to establish the yield point. The maximum typical slope is still used to determine stiffness. If automated curve processing equipment is available, a differentiator will obviously be of value in determining slopes, tangents, inflection points, etc. In any event, the fundamental objective is to measure the typical prefacture plastic flow of the crumb.

The raw prefracture flow measurement is multiplied by a conversion factor, dependent on probe and chart speeds, to convert it to standard units of length. A factor of 0.0508 (0.002 for inches) is used herein to convert to millimeters.

Stiffness and plasticity and related measurements can be calculated from the graphs as follows:

In FIG,. 4, yield point 11 and fracture point 12 have already been determined by application of the foregoing principles, and the slope line 10 has already been drawn. The horizontal scale has been converted to inches by the following calculation:

Probe speed = 0.2 in/min.; Chart speed = 10 in/min..

Therefore, 1 chart inch = 0.1 min. = 0.02 probe inches.

Chart force units are not indicated, but they relate force recordings to probe area to provide measurements in psi; the conversion factor used herein, based on calculations of our probe surface area, is 572. Line 10 of FIG. 4 can be found to have a slope of 50 (50 chart unit rise/1 chart unit run), equivalent to a stiffness (psi) of $28.6 \times 10^3$.

Plasticity flow (plasticity) can be determined to be $0.4 \times 10^{-3}$ inches by measuring horizontal distance between points 11 and 12. The stiffness/plasticity ratio is $71.5 \times 10^6$ (crisp) Log S/P = 7.85.

Similarly, in FIG. 5, slope line 14, fracture point 16, and yield point 17 have been determined, and actual horizontal scale indicated. Slope of line 14 is 1.7 (chart rise/chart run) and, therefore, stiffness is $0.97 \times 10^3$. Plastic flow (plasticity) is $60 \times 10^{-3}$ inches. Stiffness/plasticity is $0.016 \times 10^6$; log S/P = 4.2.

Had the graphs of FIGS. 4 and 5 come from points in the same cookie (they did not), [log (max. S/P) − log (min. S/P)] would be 3.65, within the scope of the invention.

The following examples illustrate the broad range of industrial applicability of the present invention, without intending to be limiting thereof. It will be appreciated that other modifications of the present invention, within the skill of those in the baking arts, can be undertaken without departing from the spirit and scope of this invention.

EXAMPLE 1

| Ingredients | Wt. Percent |
|---|---|
| Chewy Dough | |
| Hydrogenated vegetable shortening | 15.5 |
| Sugar (sucrose) | 9.5 |
| High fructose corn syrup (29% water, 40-90% fructose) | 26.4 |
| Starch | 2.1 |
| Protein | 0.75 |
| Salt | 0.4 |
| Baking soda | 0.4 |
| Flour | 24.6 |
| Flavoring | 0.05 |
| Chocolate chips | 20.3 |
| Crisp Dough Formula | |
| Hydrogenated vegetable shortening | 16.5 |
| Sugar (sucrose) | 31.2 |
| High fructose corn syrup | 7.0 |
| Salt | 0.5 |
| Baking soda | 0.5 |
| Flour | 36.6 |
| Flavoring | 0.02 |
| Minor ingredients | 1.5 |
| Water | 6.2 |

The inner, chewy dough was prepared by mixing the water and liquid flavoring material with the high fructose corn syrup. The shortening was then added and the mixture was creamed until the shortening began to crystallize. The sugar was then added, and the mixture creamed again. All the dry ingredients were then mixed in.

The outer, crisp dough was formed by mixing the ingredients in the following order: The high fructose corn syrup, water, and liquid flavor ingredients were mixed, then the shortening was added and the mixture creamed. The sugar was then added, mixing continued, and then the flour and other minor dry ingredients were added.

The doughs were rolled to the desired thickness. The outer dough was cut into two discs, the upper disc being 5 cm, the bottom disc being 4 cm. The inner dough was made into a ball and placed on top of the 4 cm disc of outer dough. The upper disc was then placed on top of the ball and the edges were crimped to seal the inner dough within.

The cookies were then baked at 8½ minutes at approximately 375° F. They were then stored in tightly sealed jars. The following cookies were made:

| Sample | Outer Dough Thickness | Ratio of Inner Dough to Outer Dough |
|---|---|---|
| A | .0254 cm (0.01") | 3.9 to 1.0 |
| B | .0762 cm (0.03") | 4.2 to 1 |
| C | .0914 cm (0.036") | 2.5 to 1 |
| D | .16 cm (0.063") | 1.8 to 1 |
| E | .236 cm (0.093") | 0.6 to 1 |
| F | .3175 cm (0.125") | 0.3 to 1 |

The cookies were sealed in a jar and stored for 25 days. The texture profile was then measured. All data points are an average of 6 cookies. FIG. 9 is the texture profile for cookie (D) having a 0.16 cm outer crust thickness. It can be seen that, after 25 days, these cookies still provide a crisp/chewy texture dichotomy.

[log max(stiffness/plasticity) − log min(stiffness/plasticity)] was 3.7

After 11 months of aging, cookies of this type had a log difference of about 1.8.

| PROFILE | (Test points as illustrated in FIG. 2) | | | | | | |
|---|---|---|---|---|---|---|---|
| | 1 | 2 | 3 | 4 | 5 | 6 | 7 |
| A | | | | | | | |
| Stiffness (psi)($10^3$) | 8.8 | .95 | .65 | 3.7 | 18.1 | .44 | .66 |
| Plasticity (in.)($10^{-3}$) | 1.6 | 64 | 27 | 14 | 6.4 | 52 | 74 |
| S/P ($10^6$) | 5.5 | .015 | .0243 | .264 | 2.83 | .0085 | .0089 |

$$\left[\log \max\left(\frac{\text{stiffness}}{\text{plasticity}}\right) - \log \min\left(\frac{\text{stiffness}}{\text{plasticity}}\right)\right] = 2.8$$

| B | | | | | | | |
|---|---|---|---|---|---|---|---|
| Stiffness ($10^3$) | 8.4 | .97 | .67 | 1.4 | 20.9 | 4.9 | .61 |
| Plasticity ($10^{-3}$) | 3.5 | 54.2 | 27.6 | 10.7 | 1.6 | 28.8 | 53.4 |
| S/P ($10^6$) | 2.4 | .018 | .024 | .13 | 13.1 | .17 | .011 |

$$\left[\log \max\left(\frac{\text{stiffness}}{\text{plasticity}}\right) - \log \min\left(\frac{\text{stiffness}}{\text{plasticity}}\right)\right] = 3.1$$

| C | | | | | | | |
|---|---|---|---|---|---|---|---|
| Stiffness ($10^3$) | 12.6 | 1.3 | .98 | 1.72 | 29 | 4.26 | 1.04 |
| Plasticity ($10^{-3}$) | 4.5 | 38 | 34 | 35.8 | 1.14 | 23.2 | 52.2 |
| S/P ($10^6$) | 2.8 | .0342 | .0288 | .048 | 25.4 | .184 | .0199 |

$$\left[\log \max\left(\frac{\text{stiffness}}{\text{plasticity}}\right) - \log \min\left(\frac{\text{stiffness}}{\text{plasticity}}\right)\right] = 3.1$$

-continued

| PROFILE | (Test points as illustrated in FIG. 2) | | | | | | |
|---|---|---|---|---|---|---|---|
| | 1 | 2 | 3 | 4 | 5 | 6 | 7 |
| D | | | | | | | |
| Stiffness ($10^3$) | 25.8 | .71 | .63 | 3.73 | 62 | 31.2 | .57 |
| Plasticity ($10^{-3}$) | 1.8 | 46.3 | 44.7 | 2.9 | 1.6 | .87 | 73.2 |
| S/P ($10^6$) | 14.3 | .0153 | .0141 | 1.29 | 38.8 | 35.9 | .0078 |

$$\left[\log \max\left(\frac{\text{stiffness}}{\text{plasticity}}\right) - \log \min\left(\frac{\text{stiffness}}{\text{plasticity}}\right)\right] = 3.7$$

| E | | | | | | | |
|---|---|---|---|---|---|---|---|
| Stiffness ($10^3$) | 58.3 | .42 | .36 | 8.3 | 50.7 | 73 | .76 |
| Plasticity ($10^{-3}$) | 1.47 | 30.5 | 35.7 | 1.5 | 1.4 | 1.2 | 51.6 |
| S/P ($10^6$) | 39.7 | .0138 | .010 | 5.53 | 36.2 | 60.8 | .0147 |

$$\left[\log \max\left(\frac{\text{stiffness}}{\text{plasticity}}\right) - \log \min\left(\frac{\text{stiffness}}{\text{plasticity}}\right)\right] = 3.8$$

| F | | | | | | | |
|---|---|---|---|---|---|---|---|
| Stiffness ($10^3$) | 56 | .51 | .72 | 7.0 | 48 | 59 | .92 |
| Plasticity ($10^{-3}$) | .74 | 71.4 | 61 | 4.2 | 4.4 | .66 | 54 |
| S/P ($10^6$) | 75.7 | .0071 | .0118 | 1.67 | 10.9 | 89 | .017 |

$$\left[\log \max\left(\frac{\text{stiffness}}{\text{plasticity}}\right) - \log \min\left(\frac{\text{stiffness}}{\text{plasticity}}\right)\right] = 4.1$$

EXAMPLE 2

The same formulas used in Example 1 were used to make a second series of chocolate chip cookies. The cookies were formed using a Rheon encrusting machine, Model 207, available from Rheon Automatic Machinery Company. The inner dough and the outer dough are co-extruded simultaneously via the encrusting machine. The outer dough wraps around the inner dough and is formed into a ball by an encrusting disc. The machine is adjusted so that the weight ratio of outer dough to inner dough is about 1.8:1 and that the balls of dough formed weigh approximately 16.5 grams.

The cookies were baked for 8½ minutes at about 153° C. (307° F.). They were then hermetically sealed under nitrogen for 14 days. The following texture profile is an average of 6 cookies for each data point.

| PROFILE | (Test points as arranged in FIG. 2) | | | | | | |
|---|---|---|---|---|---|---|---|
| | 1 | 2 | 3 | 4 | 5 | 6 | 7 |
| Stiffness ($10^3$0) | 46.2 | .59 | .65 | 3.4 | 61.5 | 1.06 | .59 |
| Plasticity ($10^{-3}$) | 2.6 | 94.6 | 72.2 | 19 | 2.2 | 41.6 | 70.2 |
| S/P ($10^6$) | 17.8 | .0062 | .009 | .18 | 28 | .025 | .00084 |

$$\left[\log \max\left(\frac{\text{stiffness}}{\text{plasticity}}\right) - \log \min\left(\frac{\text{stiffness}}{\text{plasticity}}\right)\right] = 4.5$$

EXAMPLE 3

An inner dough was prepared as in Example 1. The outer dough contained the following ingredients:

| | Percent |
|---|---|
| Hydrogenated vegetable shortening | 16.5 |
| Sugar (sucrose) | 25 |
| High fructose corn syrup | 7 |
| Salt | 0.5 |
| Baking soda | 0.5 |
| Flour | 40.98 |

-continued

| | Percent |
|---|---|
| Flavor and minor ingredients | 1.52 |
| Water | 8 |

The cookies were formed using a Rheon encrusting machine as in Example 2. The cookies were baked 8½ minutes at approximately 153° C. (307° F.). They were then hermetically sealed in nitrogen.

The texture profile was measured after 14 days. The following profile was observed:

| | (Test points as arranged in FIG. 2) | | | | | | |
|---|---|---|---|---|---|---|---|
| PROFILE | 1 | 2 | 3 | 4 | 5 | 6 | 7 |
| Stiffness ($10^3$) | 25.7 | 1.2 | .92 | 7.2 | 43.6 | 1.3 | .76 |
| Plasticity ($10^{-3}$) | 3.0 | 76.6 | 69.4 | 12.0 | 2.9 | 35.4 | 76.2 |
| S/P ($10^6$) | 8.6 | .0157 | .013 | .6 | 14.8 | .037 | .01 |

$$\left[\log\max\left(\frac{\text{stiffness}}{\text{plasticity}}\right) - \log\min\left(\frac{\text{stiffness}}{\text{plasticity}}\right)\right] = 3.2$$

EXAMPLE 4

The same chewy dough used in Example 1 was used in Example 4. A crisp dough was prepared from the following ingredients:

| | |
|---|---|
| Hydrogenated vegetable shortening | 20 |
| Sugar (sucrose) | 31.2 |
| Salt | 0.5 |
| Baking soda | 0.5 |
| Flour | 39.1 |
| Flavor and minor ingredients | 1.5 |
| Water | 7.2 |

Cookies were made using a Rheon encrusting machine as above. The cookies were baked for about 8½ minutes at about 307° F. They were then hermetically sealed in nitrogen. The following profile was obtained after 13 days.

| Profile | 1 | 2 | 3 | 4 | 5 | 6 | 7 |
|---|---|---|---|---|---|---|---|
| Stiffness ($10^3$) | 39.4 | 1.6 | 1.3 | 7.4 | 31.0 | 4.5 | 1.3 |
| Plasticity ($10^{-3}$) | 2.0 | 33.2 | 50.2 | 2.4 | 2.4 | 39.8 | 32.6 |
| S/P ($10^6$) | 19.7 | .048 | .026 | 3.08 | 12.92 | .11 | .04 |

$$\left[\log\max\left(\frac{\text{stiffness}}{\text{plasticity}}\right) - \log\min\left(\frac{\text{stiffness}}{\text{plasticity}}\right)\right] = 2.9$$

EXAMPLE 5

The following formulation was used to prepare the chewy dough:

| Ingredient | Percent |
|---|---|
| Hydrogenated vegetable shortening | 15.5 |
| Sugar (sucrose) | 8.25 |
| High fructose corn syrup | 29.7 |
| Starch | 2 |
| Whole egg solids | 1 |
| Whey protein | 0.73 |
| Salt | 0.4 |
| Soda | 0.4 |
| Flour | 21.7 |
| Flavor | 0.02 |

-continued

| Ingredient | Percent |
|---|---|
| Chocolate chips | 20.3 |

The following formulation was used to prepare the crisp dough:

| Ingredient | Percent |
|---|---|
| Hydrogenated vegetable shortening | 16.5 |
| Sugar (sucrose) | 34.8 |
| High fructose corn syrup | 2 |
| Whole egg solids | 1 |
| Salt | 0.5 |
| Soda | 0.5 |
| Flour | 34.2 |
| Flavors | 1.5 |
| Water | 9 |

The dough was prepared by mixing the ingredients together as in Example 1. The following executions were made. Bar cookies were prepared by putting a layer of outer dough of a thickness of about 0.06 inches, then layering a sheet of inner dough, and then a third layer of outer dough having a thickness the same as the bottom layer. The sheets of dough were baked at about 375° F. for about 16 minutes. The sheet size was approximately 10 inches in diameter. The baked sheet was then cut into approximately 12 cookies of equal size while hot. The cookies were stored in a sealed jar for 25 days. The following texture profile was obtained:

(1) Bar Cookie

| | (Test points arranged to show texture variations top-to-bottom) | | | | | | |
|---|---|---|---|---|---|---|---|
| Profile | 1 | 2 | 3 | 4 | 5 | 6 | 7 |
| Stiffness (psi)($10^3$) | 12.6 | 16.7 | .6 | .4 | .4 | 21.1 | 22.8 |
| Plasticity (in.)($10^3$) | 5.0 | .8 | 82.6 | 76.6 | 86 | 4.2 | 5.0 |
| S/P ($10^6$) | 2.5 | 20.9 | .007 | .005 | .005 | 5.02 | 4.6 |

$$\left[\log\max\left(\frac{\text{stiffness}}{\text{plasticity}}\right) - \log\min\left(\frac{\text{stiffness}}{\text{plasticity}}\right)\right] = 3.6$$

(2) Multi-layer Cookies

Drop cookies having a diameter of about 2½ inches were formed by layering thin sheets of dough having a thickness of about 0.06 inches. The layers were outer dough, inner dough, outer dough, inner dough, outer dough. These cookes were then stored for 25 days in a sealed jar and gave the following profile.

| Profile | 1 | 2 | 3 | 4 | 5 | 6 | 7 | 8 |
|---|---|---|---|---|---|---|---|---|
| Stiffness ($10^3$) | 29.6 | 1.5 | 2.0 | 3.2 | 44.4 | 5.4 | 4.8 | 7.1 |
| Plasticity ($10^{-3}$) | .4 | 16.2 | 10.2 | 6.0 | .7 | 5.2 | 2.4 | 2.0 |
| S/P ($10^6$) | 74 | .09 | .20 | .93 | 63.4 | 1.04 | 2.0 | 3.55 |

$$\left[\log\max\left(\frac{\text{stiffness}}{\text{plasticity}}\right) - \log\min\left(\frac{\text{stiffness}}{\text{plasticity}}\right)\right] = 2.9$$

(3) Pinwheel Cookies

Both the outer dough and inner dough were rolled to a thickness of about 0.16 cm (0.063"). The inner dough sheet was placed upon the outer dough sheet. The sheets were then rolled up in jelly roll fashion. Cookies were then cut from the roll.

These cookies were baked for about 10 minutes at about 190° C. (375° F.). The baked cookies were then stored for about 25 days in a closed container. The following data were obtained on the texture measurements.

|  | Maximum | Minimum |
|---|---|---|
| Stiffness ($10^3$) | 7.26 | 0.63 |
| Plasticity ($10^{-3}$) | 1.44 | 66 |
| S/P ($10^6$) | 5.04 | 0.0095 |
| Log S/P | 6.70 | 3.98 |

(4) Strand Cookies

Another variation of the textural variability was achieved by rolling each of the doughs into strands of about 0.5 cm. in diameter. The strands were placed together in parallel to make a bundle of strands. These bundles were then cut into dough balls of approximately 16 g. each. The dough balls were then baked for about 8½ minutes at 190° C. (375° F.). After 25 days of storage in a sealed container these cookies had the following textural dichotomy:

|  | Maximum | Minimum |
|---|---|---|
| Stiffness ($10^3$) | 35.3 | 1.04 |
| Plasticity ($10^{-3}$) | 0.4 | 92.2 |
| S/P ($10^6$) | 88.2 | .0114 |
| Log S/P | 7.95 | 4.06 |

In the chewy dough, the high fructose corn syrup can be replaced by equivalent sweetening amounts of fructose, honey, dextrose, corn syrup, maltose, or a 50:50 mixture of lactose and sucrose. Adjustment of water content may be necessary.

In the crisp dough, the sucrose and high fructose corn syrup can together be replaced by a 94:6 sucrose:dextrose syrup of equivalent water content.

EXAMPLE 6

In the foregoing examples, the following can be used as crystallization-resistant sugars: psicose, sorbose, tagatose, allose, altrose, glucose, mannose, gulose, idose, galactose, talose, maltose and lactose, and mixtures thereof.

The present invention also provides a method for making a cookie, comprising the steps of
(1) forming a portion of dough, which, when baked provides a stable, crisp texture;
(2) forming a portion of dough, which, when baked, provides a stable, chewy texture;
(3) separately baking the dough portions; and
(4) adherently contacting the baked dough portions substantially immediately after baking, to form a single cookie.

What is claimed is:

1. A sweetened food product in the form of a cookie dough preform, comprising a matrix made from cookie ingredients, and being characterized in having distributed therein discrete regions of dough containing readily crystallizable sugar, comprising a mono- or di-saccharide or mixture thereof that readily and spontaneously crystallizes at the water content and water activity conditions encountered in the dough, when baked; and discrete regions of dough containing crystallization resistant sugar, comprising a mono- or di-saccharide or mixture thereof which crystallizes, at the water content and water activity encountered in the dough, when baked, substantially more slowly than sucrose under the same conditions, whereby the product, when baked, provides a storage-stable plurality of textures, the regions containing readily crystallizable sugar providing a crisp texture, and the regions containing crystallization resistant sugar providing a chewy texture, and further characterized in that the regions providing a crisp crumb and the regions providing a chewy crumb provide crumbs having a

[log max(stiffness/plasticity)−log min(stiffness/plasticity)]

of at least about 1.75.

2. A cookie dough preform according to claim 1 which further comprises a member selected from the group consisting of cereals, nutmeats, peanut butter, cocoa, raisins, chocolate chips, and butterscotch chips, and mixtures thereof.

3. A cookie dough preform according to claim 2 wherein the cereal is oatmeal.

4. A cookie dough preform according to claim 2 wherein the nutmeat is coconut.

5. A cookie dough preform according to claim 1 wherein the crystallization-resistant sugar is a member selected from the group consisting of fructose, dextrose, and mixtures of sugars of which fructose and dextrose together comprise at least about 15% by weight, and solutions thereof.

6. A cookie dough preform according to claim 5 wherein the crystallization-resistant sugar is high fructose corn syrup.

7. A cookie dough preform according to claim 5 wherein the crystallization-resistant sugar is honey.

8. A cookie dough preform according to claim 5 wherein the crystallization-resistant sugar is invert sugar.

9. A cookie dough preform according to claim 1 wherein the readily crystallizable sugar is a member selected from the group consisting of sucrose, and mixtures of sugars containing greater than about 75% sucrose by weight, and solutions thereof.

10. A baked, sweetened food product in the form of a cookie, comprising a crumb-continuous matrix made from cookie ingredients and being characterized and having distributed therein discrete regions of crumb containing crystallized sugar and discrete regions of crumb containing crystallization resistant sugar comprising a mono- or di-saccharide or mixture thereof, which crystallizes, at the water content and water activity of the cookie substantially more slowly than sucrose under the same conditions, whereby the product provides a storage-stable plurality of textures, the regions containing crystallized sugar providing a crisp texture in the regions containing crystallization resistant sugar providing a chewy texture and having a

[log max(stiffness/plasticity)−log min(stiffness/plasticity)]

of at least about 1.75.

11. A cookie according to claim 10 which further comprises a member selected from the group consisting of cereals, nutmeats, peanut butter, cocoa, raisins, chocolate chips, and butterscotch chips, and mixtures thereof.

12. A cookie according to claim 11 wherein the cereal is oatmeal.

13. A cookie according to claim 11 wherein the nutmeat is coconut.

14. A cookie according to claim 10 wherein the crystallization resistant sugar is a member selected from the group consisting of fructose, dextrose, and mixtures of sugars of which fructose and dextrose together comprise at least about 15% by weight, and solutions thereof.

15. A cookie according to claim 14 wherein the crystallization resistant sugar is high fructose corn syrup.

16. A cookie according to claim 14 wherein the crystallization resistant sugar is honey.

17. A cookie according to claim 14 wherein the crystallization resistant sugar is invert sugar.

18. A cookie according to claim 10 wherein the readily crystallizable sugar is a member selected from the group consisting of sucrose, and mixtures of sugars containing greater than about 75% sucrose by weight, and solutions thereof.

19. A dough-based, ready-to-bake, sweetened food product in the form of a laminated dough structure, which, when baked, has a substantially homogeneous cross-section with respect to flavor and appearance and a shelf-stable cross-sectional texture variability typical of freshly baked cookies, comprising:
  (a) a discrete body of a first cookie dough which comprises
    (i) a crystallization resistant sugar component comprising a mono- or di-saccharide or mixture thereof which crystallizes substantially more slowly than sucrose at the water content and water activity conditions of the baked cookie and
    (ii) flour, water and shortening and
  (b) a lamina of a second cookie dough superposed on at least a portion of the surface of said first cookie dough, said second cookie dough comprising
    (i) a readily crystallizable sugar component comprising a mono- or di-saccharide or mixture thereof which readily and spontaneously crystallizes at the water content and water activity of the baked cookie and
    (ii) flour, water and shortening.

20. A laminated dough structure according to claim 19 wherein the lamina of second cookie dough is superposed continuously across the entire surface of said first cookie dough.

21. A laminated dough structure according to claim 19 wherein at least one of the cookie doughs further comprises a member selected from the group consisting of cereals, nutmeats, peanut butter, cocoa, raisins, chocolate chips, and butterscotch chips, and mixtures thereof.

22. A laminated dough structure according to claim 21 wherein the cereal is oatmeal.

23. A laminated dough structure according to claim 21 wherein the nutmeat is coconut.

24. A laminated dough structure according to claim 19 wherein the crystallization resistant sugar is a member selected from the group consisting of fructose, dextrose, and mixtures of sugars of which fructose and dextrose together comprise at least about 15% by weight, and solutions thereof.

25. A laminated dough structure according to claim 24 wherein the crystallization resistant sugar component is high fructose corn syrup.

26. A laminated dough structure according to claim 24 wherein the crystallization resistant sugar component is honey.

27. A laminated dough structure according to claim 24 wherein the crystallization resistant sugar is invert sugar.

28. A laminated dough structure according to claim 19 wherein the readily crystallizable sugar is a member selected from the group consisting of sucrose, and mixtures of sugars containing greater than about 75% sucrose by weight, and solutions thereof.

29. A baked, laminated dough structure according to claim 19.

30. A sugar cookie according to claim 29.

31. An oatmeal cookie according to claim 29.

32. A peanut butter cookie according to claim 29.

33. A chocolate chip cookie according to claim 29.

34. A double chocolate chip cookie according to claim 29.

35. A method for making a laminated dough structure comprising: preparing a first cookie dough from cookie ingredients comprising a crystallization resistant sugar component comprising a mono- or di-saccharide or mixture thereof that crystallizes substantially more slowly than sucrose at the water content and water activity conditions encountered in semi-moist cookies of the home-baked type; and flour and shortening; preparing a second cookie dough comprising a readily crystallizable sugar component comprising a mono- or di-saccharide or moisture thereof which readily and spontaneously crystallizes, at the water content and water activity encountered in semi-moist cookies of the home-baked type, and flour and shortening and applying a layer of said second dough to said first dough, thereby forming a laminated dough structure.

36. A method for making a cookie having a shelf stable cross-sectional texture variability typical of freshly baked cookies, according to claim 35, which method further comprises the step of baking said laminated structure.

37. A method for making a cookie and characterized in having, at a time after reaching substantial texture equilibrium, a $$[\log \max(\text{stiffness/plasticity}) - \log \min(\text{stiffness/plasticity})]$$

of at least about 1.75, comprising the steps of:
  (1) forming a first cookie dough from cookie ingredients comprising a readily crystallizable sugar component comprising a mono- or di-saccharide or mixture thereof which readily and spontaneously crystallizes, at the water content and water activity encountered in semi-moist cookies of the home-baked type; and flour and shortening, which, when baked, provides a stable, crisp texture;
  (2) forming a second cookie dough, from cookie ingredients comprising a crystallization resistant sugar component comprising a mono- or di-saccharide or mixture thereof that crystallizes, substantially more slowly than sucrose at the water content and water activity conditions encountered in semi-moist cookies of the home-baked type; and flour and shortening, which, when baked, provides a stable, chewy texture;

(3) separately baking the dough portions; and (4) adherently contacting the baked dough portions substantially immediately after baking, to form a single cookie.

38. A cookie comprising at least one biscuit portion according to claim 10, or 19, and further comprising a member selected from the group consisting of fillings and icings.

39. A cookie dough preform according to claim 1 wherein the crystallization-resistant sugar is a member selected from the group consisting of fructose, dextrose, and mixtures and solutions of sugars of which fructose and dextrose comprise at least about 25% by weight.

40. A cookie according to claim 10 wherein the crystallization-resistant sugar is a member selected from the group consisting of fructose, dextrose, and mixtures and solutions of sugars of which fructose and dextrose comprise at least about 25% by weight.

41. A laminated dough structure according to claim 19 wherein the crystallization-resistant sugar is a member selected from the group consisting of fructose, dextrose, and mixtures and solutions of sugars of which fructose and dextrose comprise at least about 25% by weight.

42. A cookie according to claim 10 wherein the readily crystallizable sugar is sucrose and mixtures and solutions of sugars of which sucrose comprises at least about 85% by weight.

43. A laminated dough structure according to claim 19 wherein the readily crystallizable sugar is sucrose and mixtures and solutions of sugars of which sucrose comprises at least about 85% by weight.

44. A cookie according to claim 10 which has a textural dichotomy of at least about 2 as determined by the formula $$[\log \max(\text{stiffness/plasticity}) - \log \min(\text{stiffness/plasticity})]$$

45. A method for making a ready-to-serve cookie having the eating qualities of fresh home-baked cookies in storage-stable form comprising the steps of:

(1) preparing an inner cookie dough from cookie ingredients comprising crystallization-resistant sugar of which at least 25% by weight is fructose and dextrose, flour and shortening;

(2) preparing an outer cookie dough from cookie ingredients comprising readily crystallizable sugar which comprises more than 85% by weight sucrose, flour and shortening;

(3) substantially enveloping said inner dough with said outer dough;

(4) baking the combined doughs and tempering the baked product to produce a crumb-continuous cookie having a chewy interior associated with the presence of uncrystallized sugar and a crisp exterior associated with the presence of crystallized sucrose, said crisp and chewy crumb portions having a texture difference of at least about 2 as determined by the formula $$[\log \max(\text{stiffness/plasticity}) - \log \min(\text{stiffness/plasticity})].$$

46. A ready-to-serve chocolate chip cookie having the eating qualities of fresh home-baked cookies, comprising: a continuous cookie crumb having a crisp exterior and a chewy interior made from two separate doughs comprising cookie ingredients, said doughs containing different sugar compositions, the sugar of said crisp exterior crumb region comprising crystallized sucrose and the sugar of said chewy interior crumb region comprising a crystallization resistant sugar containing at least about 25% by weight fructose and dextrose, the balance of each of the separate doughs comprising flour and shortening.

47. A ready-to-serve cookie according to claim 10 wherein said crystallization-resistant sugar comprises high fructose corn syrup.

48. A ready-to-serve cookie having the eating qualities of fresh home-baked cookies comprising: a storage-stable continuous cookie crumb composed of an exterior crumb region having a crisp texture produced by crystallized sucrose distributed therein and an interior crumb region having a chewy texture produced by uncrystallized sugar distributed therein, said uncrystallized sugar being at least 25% by weight fructose and dextrose, said crisp and chewy crumb regions being made from two separate doughs comprising in addition to said sucrose and said uncrystallized sugar, flour and shortening, and said cookie having a textural dichotomy of at least about 2 as determined by the formula $$[\log \max(\text{stiffness/plasticity}) - \log \min(\text{stiffness/plasticity})]$$

* * * * *

Disclaimer 4,455,333.—*Charles A. Hong*, Deerfield Township, Hamilton County; *William J. Brabbs*, Springfield Township, Hamilton County, both of Ohio. DOUGHS AND COOKIES PROVIDING STORAGE-STABLE TEXTURE VARIABILITY. Patent dated June 19, 1984. Disclaimer filed Jan. 8, 1990, by the assignee, The Proctor & Gamble Company.

Hereby enters this disclaimer to claim 35 of said patent.
[*Official Gazette May 1, 1990*]